United States Patent
Jaffari

(10) Patent No.: US 9,051,950 B2
(45) Date of Patent: Jun. 9, 2015

(54) UNIVERSAL PANEL CLAMP

(71) Applicant: Thomas & Betts International, Inc., Wilmington, DE (US)

(72) Inventor: Andy A. Jaffari, Bartlett, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 17 days.

(21) Appl. No.: 13/958,984

(22) Filed: Aug. 5, 2013

(65) Prior Publication Data

US 2014/0042286 A1 Feb. 13, 2014

Related U.S. Application Data

(60) Provisional application No. 61/680,893, filed on Aug. 8, 2012.

(51) Int. Cl.
| | |
|---|---|
| *F16B 1/00* | (2006.01) |
| *F16B 2/06* | (2006.01) |
| *F16B 2/12* | (2006.01) |
| *F16B 7/18* | (2006.01) |
| *F24J 2/52* | (2006.01) |

(52) U.S. Cl.
CPC . *F16B 2/065* (2013.01); *F16B 2/12* (2013.01); *F16B 7/187* (2013.01); *F24J 2/5203* (2013.01)

(58) Field of Classification Search
USPC ......... 248/689, 643, 680, 237, 226.11, 228.3; 52/173.3, 460, 464, 584.1, 710; 24/521, 571
See application file for complete search history.

(56) References Cited

U.S. PATENT DOCUMENTS

| | | | | |
|---|---|---|---|---|
| 1,144,120 | A * | 6/1915 | gladwin | 29/560.1 |
| 1,893,481 | A | 1/1933 | Adams | |
| 2,733,492 | A * | 2/1956 | Copell | 248/316.7 |
| 6,269,596 | B1 | 8/2001 | Ohtsuka et al. | |
| 6,672,018 | B2 | 1/2004 | Shingleton | |
| 7,434,362 | B2 | 10/2008 | Liebendorfer | |
| 7,435,134 | B2 * | 10/2008 | Lenox | 439/567 |
| 7,592,537 | B1 | 9/2009 | West | |
| 7,600,349 | B2 | 10/2009 | Liebendorfer | |
| 7,634,875 | B2 | 12/2009 | Genschorek | |
| 7,735,270 | B2 | 6/2010 | Olle et al. | |
| 7,748,175 | B2 | 7/2010 | Liebendorfer | |
| 7,766,292 | B2 | 8/2010 | Liebendorfer | |
| 7,774,998 | B2 | 8/2010 | Aschenbrenner | |
| 7,780,472 | B2 | 8/2010 | Lenox | |
| 7,797,883 | B2 | 9/2010 | Tarbell et al. | |
| 7,856,769 | B2 | 12/2010 | Plaisted et al. | |
| 8,128,044 | B2 * | 3/2012 | Liebendorfer | 248/237 |
| 8,181,926 | B2 * | 5/2012 | Magno et al. | 248/237 |
| 8,424,255 | B2 * | 4/2013 | Lenox et al. | 52/173.3 |

(Continued)

FOREIGN PATENT DOCUMENTS

| | | |
|---|---|---|
| CA | 2644141 | 9/2007 |
| CA | 2655027 | 12/2007 |

(Continued)

*Primary Examiner* — Bradley Duckworth

(74) *Attorney, Agent, or Firm* — Snyder, Clark, Lesch & Chung, LLP

(57) ABSTRACT

A clamp includes a top portion having a mounting hole configured to receive a mounting bolt. The top portion also includes a clamping surface configured to contact a first structure to be clamped to a framing member. The clamping surface includes a number of teeth, wherein at least some of the teeth have different angular profiles.

20 Claims, 8 Drawing Sheets

(56) References Cited

U.S. PATENT DOCUMENTS

| | | |
|---|---|---|
| 8,496,236 B2 | 7/2013 | Merhar et al. |
| 8,505,864 B1 * | 8/2013 | Taylor et al. ............ 248/237 |
| 8,627,617 B2 * | 1/2014 | Haddock et al. ......... 52/173.3 |
| 8,763,968 B2 * | 7/2014 | Liebendorfer ............ 248/237 |
| 2003/0015637 A1 * | 1/2003 | Liebendorfer ............ 248/237 |
| 2011/0126881 A1 | 6/2011 | Hong et al. |
| 2011/0174947 A1 * | 7/2011 | Wu ...................... 248/226.11 |
| 2011/0214365 A1 * | 9/2011 | Aftanas .................... 52/173.3 |
| 2011/0214367 A1 * | 9/2011 | Haddock et al. ......... 52/173.3 |
| 2012/0102853 A1 * | 5/2012 | Rizzo ....................... 52/173.3 |
| 2014/0137489 A1 * | 5/2014 | Habdank et al. ......... 52/173.3 |

FOREIGN PATENT DOCUMENTS

| | | |
|---|---|---|
| CA | 2603039 | 3/2008 |
| CA | 2681970 | 10/2008 |
| CA | 2717883 | 9/2009 |
| CA | 2692398 | 4/2011 |
| CA | 2725853 | 6/2011 |
| EP | 1 647 782 | 10/2005 |
| EP | 2292988 | 3/2011 |
| WO | WO03/034505 | 4/2003 |
| WO | WO2011/014742 | 3/2011 |
| WO | WO2011/154019 | 12/2011 |

* cited by examiner

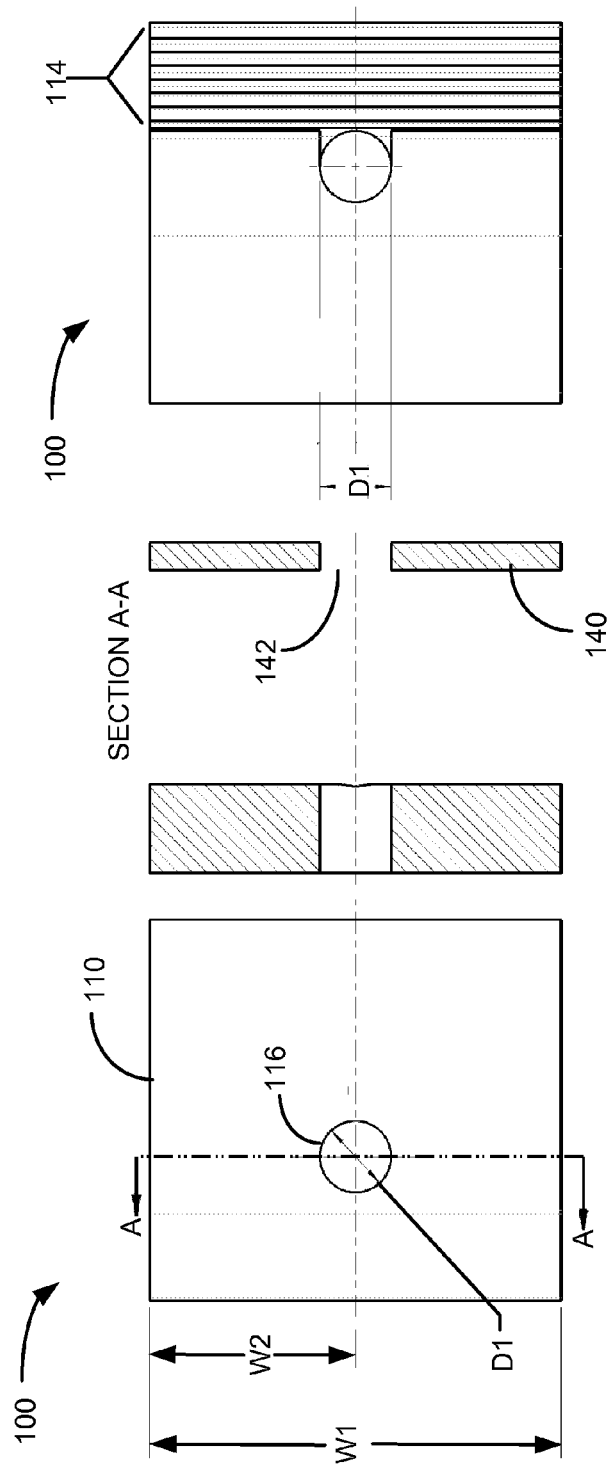

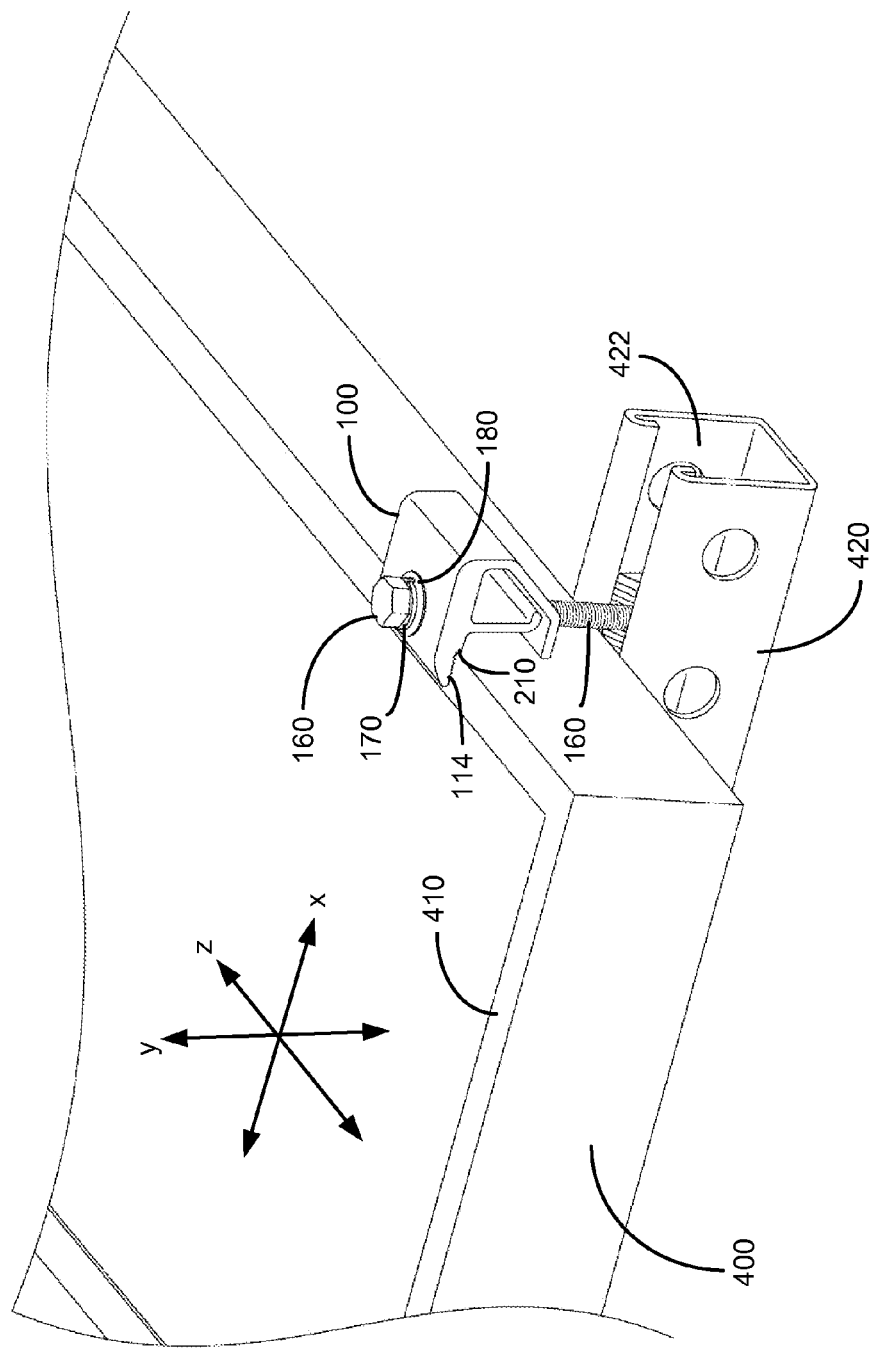

UNIVERSAL PANEL CLAMP

RELATED APPLICATION

This application claims priority under 35 U.S.C. §119 based on U.S. Provisional Patent Application No. 61/680,893, filed Aug. 8, 2012, the disclosure of which is hereby incorporated herein by reference.

BACKGROUND INFORMATION

Traditional clamps often include mechanisms that allow the clamps to secure devices having varying sizes. For example, panel clamps that are used to secure panels to framing members may be adjustable to support panels having a number of different sizes. One drawback with using such a clamp is that the clamp may suffer from inadequate clamping force when used to hold panels having different sizes/thicknesses. As a result, the clamp may slip as it is being tightened or even fail after it is installed.

BRIEF DESCRIPTION OF THE DRAWINGS

FIGS. 3A, 3B and 3C are a top view, sectional view and bottom view, respectively, of the clamp of FIG. 1;

FIG. 4 is an isometric view of the clamp of FIG. 1 securing a panel to a strut channel member;

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Embodiments described herein provide a clamp that may be used in combination with a structural member, such as a strut channel, to secure another member (e.g., a panel or frame) to the structural member. In an exemplary implementation, the clamp includes a clamping surface that includes grooves or teeth having different angles with respect to the clamping surface. The clamp also includes a mounting hole for a clamp screw or bolt that will be connected to a clamp nut. As the screw/bolt is tightened, the clamping surface contacts the panel to achieve a very high gripping force. The mounting hole and screw/bolt may also be located to ensure that the clamp does not move or slip off of the frame as the screw/bolt is tightened.

Figure 1:
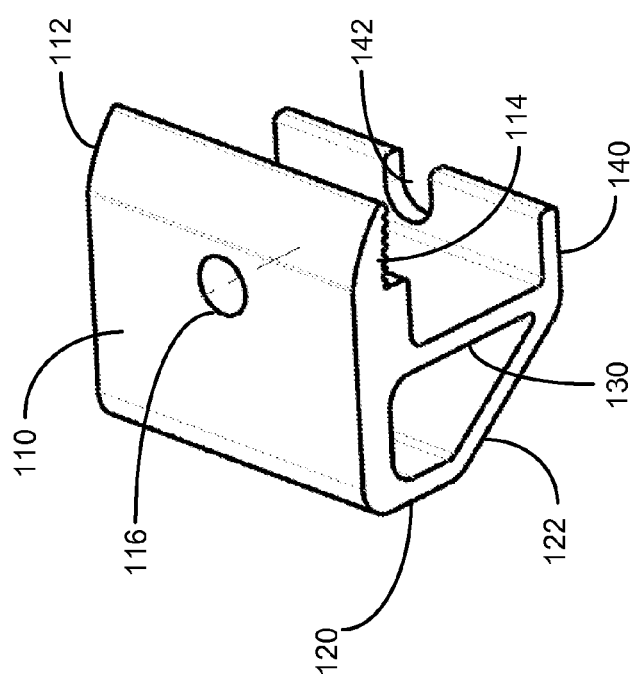
FIG. 1 is an isometric view of a clamp consistent with an exemplary implementation.

FIG. 1 is an isometric view of an exemplary clamp 100 (also referred to as panel clamp 100). Panel clamp 100 may be an end panel clamp used to secure an end portion of a member, such as a solar panel, to a framing structure. Referring to FIG. 1, panel clamp 100 includes top portion 110, side members 120 and 130 (also referred to as side portions 120 and 130) and bottom member 140. In an exemplary implementation, the components illustrated in FIG. 1 may be fabricated out of metal, such as, aluminum, steel (e.g., galvanized steel), or some other metal. In other implementations, all or some of the components illustrated in FIG. 1 may be fabricated using other materials, such as plastic or composite materials. In addition, in an exemplary implementation, top portion 110, side portions 120 and 130 and bottom portion 140 may be formed as a unitary structure or as a single body, as opposed to being formed from multiple bodies, components or pieces.

Top portion 110 may be generally rectangular in shape and may include a beveled top surface. For example, portion 112 may angle from the top surface of top portion 110 at one end of top portion 110. The lower surface of portion 112 may include grooves 114 (also referred to as teeth 114) to facilitate gripping a structure that is to be clamped, such as a solar panel or a frame of a solar panel. The sidewalls of various ones of teeth 114 may be angled at different angles to enhance the gripping capability of clamp 100 with respect to a number of different sized objects that may be secured by clamp 100, as described in detail below. Top portion 110 may also include mounting hole or opening 116 that receives a clamp bolt or screw (not shown). In an exemplary implementation, mounting hole 116 may be located to aid clamp 100 in achieving a maximum clamping force, while also ensuring the clamp 100 does not slip, as described in detail below.

Side members 120 and 130 extend from top portion 110 and connect to bottom portion 140. The upper portion of side member 120 may extend from top portion at approximately a 90 degree angle. The lower portion of side member 120 may include an angled portion 122 that extends to lower portion 140. In an exemplary implementation, angled portion 122 may extend from the upper portion of side member 120 at an angle ranging from about 40 degrees to 60 degrees (e.g., 50 degrees). Side member 130 may extend from top portion 110 at approximately a 90 degree angle. Side members 120 and 130 provide structural support to allow panel clamp 100 to achieve sufficient structural rigidity and strength.

Bottom portion 140 extends from side portion 130 at approximately a 90 degree angle. Bottom portion 140 may also include a semi-circular opening 142 to allow a clamp screw (not shown) to pass through clamp 100. For example, a clamp screw or threaded bolt may extend through mounting hole 116, down through opening 142 and connect to a framing support member, as described in detail below. Opening 142 may facilitate guiding the clamp screw/bolt as it is being tightened to ensure that clamp 100 remains properly positioned with respect to a panel/frame that is being clamped. In other implementations, opening 142 may have other shapes. For example, opening 142 may be circular and be contained completely within bottom portion 140.

Figure 2A:
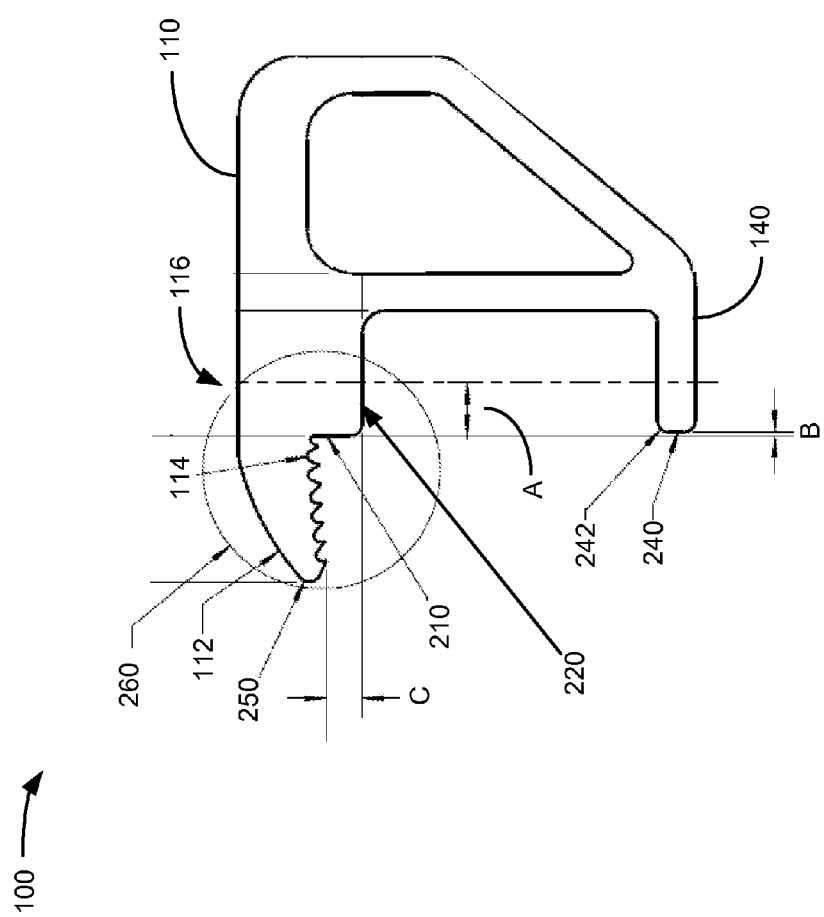
FIG. 2A is a side view of the clamp of FIG. 1.

FIG. 2A is a side view of clamp 100 of FIG. 1 consistent with an exemplary implementation. Referring to FIG. 2A, the center of mounting hole 116 in the axial direction (represented by the dashed line) may be located a distance A in the lateral direction from face/wall 210 of upper portion 110. Face 210 of upper portion 110 may abut the tooth 114 located closest to mounting hole 116. In an exemplary implementation, the distance A may range from approximately 0.13 inches to 0.17 inches, based on the size of clamp 100. For example, in one implementation in which the overall length of top portion 110 (including portion 112) is about 1.4 inches, distance A may be 0.14 inches. The location of mounting hole 116, and the clamp bolt/screw that extends through mounting hole 116, with respect to face 210 may allow clamp 100 to achieve a maximum clamping power when clamp 100 is used to clamp components/members having varying thickness, while minimizing or eliminating the possibility that clamp 100 may slip as the clamp bolt/screw is being tightened.

Taken collectively, teeth 114 may form a clamping surface that contacts a member to be clamped, such as a solar panel or a panel frame. In an exemplary implementation, the sidewalls of teeth 114 may have a number of different angles or angular profiles to provide for increased gripping strength for clamp 100. For example, in an exemplary implementation, the angle of the side walls of several teeth 114 located at the left or forward side of the clamping surface illustrated in FIG. 2A may have an angle of less than 45 degrees with respect to the clamping surface formed by the vertices or points of all of teeth 114, such as an angle ranging from about 25 degrees to 40 degrees (e.g., 35 degrees). Other ones of teeth 114, such as the innermost teeth 114 located closest to face 210 may have an angle of greater than 50 degrees with respect to the clamping surface, such as an angle ranging from about 50 degrees to 70 degrees. Providing the different angles/angular profiles for teeth 114 enhances the gripping power of clamp 100 in various directions with respect to the member being clamped, as described in more detail below.

In addition, in one implementation, the clamping surface formed by teeth 114 (i.e., a plane that connects the lower points or vertices of each tooth 114) may be angled with respect to horizontal surface 220 located on the lower side of upper portion 110, as described in more detail below. Angling the clamping surface in this manner also results in increased gripping power for clamp 100 with respect to the member being clamped.

Face 240 of lower portion 140 may include rounded corners, labeled 242 in FIG. 2A. In addition, in an exemplary implementation, face 240 of lower portion 140 may not extend beyond face 210 of upper portion 110. In one implementation, the lateral distance between face 240 and face 210, labeled distance B in FIG. 2A, may be approximately 0.010 inches. In other implementations, distance B may be smaller or greater. In each case, the lateral location of face 240 with respect to face 210 ensures the proper alignment of clamp 100 with respect to the structure to be secured by clamp 100.

In an exemplary implementation, the nose of angled portion 112, labeled 250 in FIG. 2A may be rounded. In addition, the distance between the outermost tooth 114 and surface 220, labeled C in FIG. 2B, may range from 0.10 to 1.2 inches (e.g., 0.94 inches). The distance C may help ensure that a panel being clamped is properly aligned and abuts face 210 when the panel is being secured. As described above, the clamping surface of clamp 100 formed by teeth 114 (located within the area labeled 260 in FIG. 2A) is angled and includes teeth having different angular profiles to enhance the gripping force of clamp 100, as described in detail below.

Figure 2B:
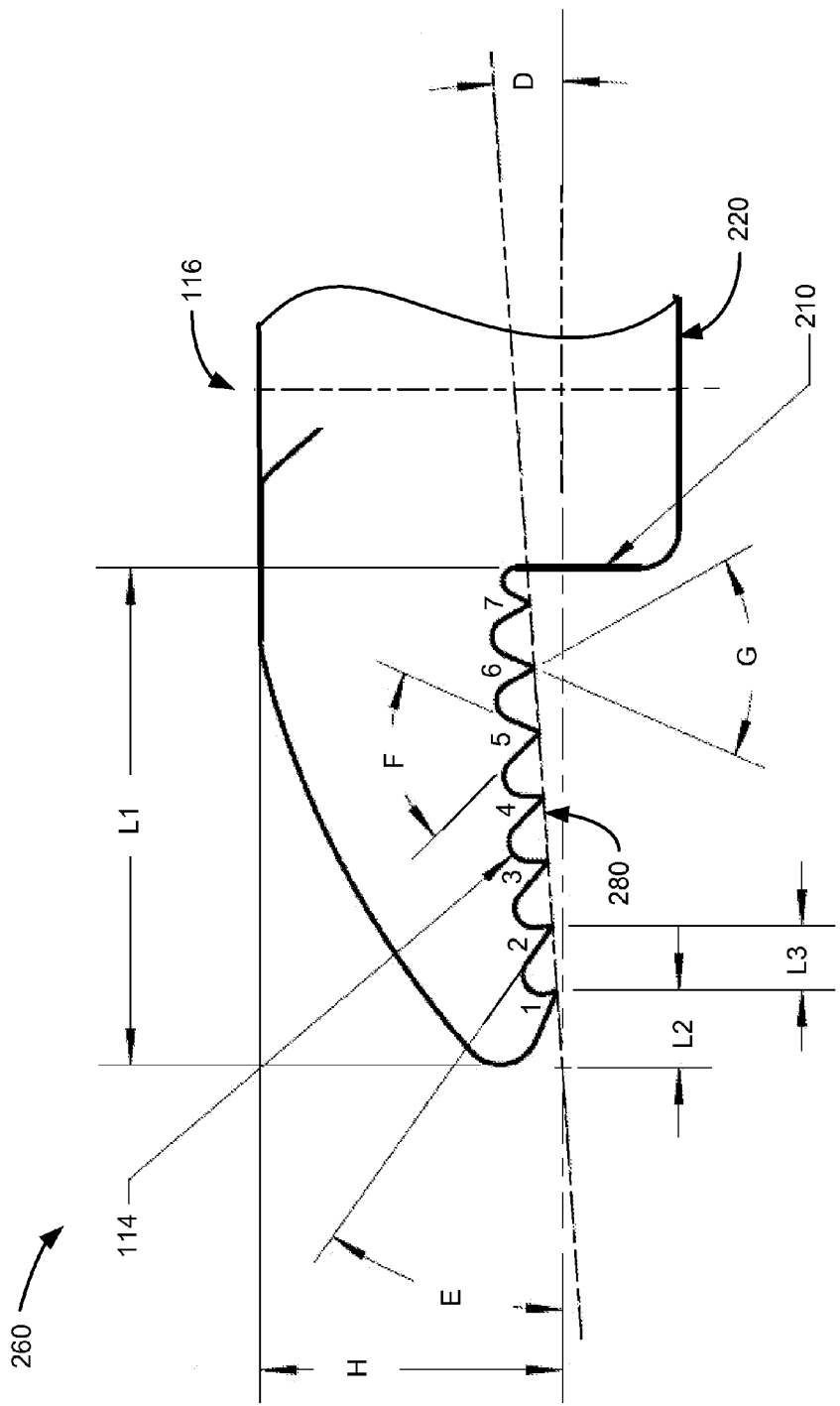
FIG. 2B is an enlarged view of a portion of the clamp of FIG. 1 according to an exemplary implementation.

FIG. 2B illustrates an enlarged view of portion 260 of clamp 100. As described above, the clamping surface (represented by the dashed line labeled 280 in FIG. 2B) formed by teeth 114 (labeled 1-7 in FIG. 2B) may be angled with respect to a lateral plane parallel to surface 220. For example, in one implementation, the angle of the clamping surface with respect to a lateral plane that is parallel to surface 220 (or parallel to the planar surface of top portion 110), illustrated as angle D in FIG. 2B, may range from approximately three degrees to five degrees (e.g., four degrees).

As described above, teeth 114 may also include side walls that are angled differently from other ones of teeth 114. For example, the angle of the left sidewall associated with tooth 2, labeled angle E in FIG. 2B, may range from approximately 30 degrees to 45 degrees. In one implementation, angle E may be approximately 35 degrees. In addition, in an exemplary implementation, the left sidewall of the first four teeth 114 labeled 1-4 in FIG. 2B, may have the same angle (e.g., 35 degrees) with respect to clamping surface 280. The right sidewall of each of teeth 1-4 may be more vertical with respect to clamping surface 280. For example, the angle for the right sidewall of each of teeth 1-4 with respect to clamping surface 280 may range from about 80 degrees to about 100 degrees (e.g., 90 degrees). The acute angles associated with the left sidewalls of teeth 1-4 aid in allowing the clamping surface (e.g., teeth 1-4) to slightly dig into a member (e.g., a solar panel frame) that is to be clamped, when the clamp bolt/screw (not shown) is tightened, to enhance or maximize the clamping force along an x direction (e.g., width direction) of the member being clamped.

The fifth through seventh teeth 114, labeled 5-7 in FIG. 2B, may include differently angled sidewalls than those of teeth 1-4. As illustrated, the left sidewall of tooth 5 may be steeper or less acute with respect to clamping surface 280 than the left sidewalls of teeth 1-4. For example, the left sidewall of tooth 5 with respect to the clamping surface may range from about 50 degrees to about 60 degrees. In addition, the right sidewall of tooth 5 with respect to clamping surface 280 may be less steep/vertical with respect to the clamping surface than the corresponding right sidewall of teeth 1-4. For example, the right sidewall of tooth 5 with respect to clamping surface 280 may range from 60 degrees to 70 degrees. As a result, tooth 5 has a wider angular profile than teeth 1-4. For example, in an exemplary implementation, the angle between the sidewalls of tooth 5, labeled F in FIG. 2B, may range from 50 degrees to about 70 degrees. In one implementation, angle F may be 68 degrees.

In an exemplary implementation, teeth 6 and 7 may have the same or slightly different angular profiles than tooth 5. For example, in one implementation, the left sidewall of tooth 6 may be slightly steeper or more vertical with respect to the clamping surface 280 than the left sidewall of tooth 5. For example, the right sidewall of tooth 6 may form an angle of about 65 degrees with respect to clamping surface 280 and the right sidewall of tooth 5 may form an angle of about 60 degrees with respect to clamping surface 280. The right sidewall of tooth 6, however, may be angled similar to that of tooth 5. In an exemplary implementation, the angle between the sidewalls of tooth 6, labeled G in FIG. 2B may range from about 50 degrees to 60 degrees (e.g., 53 degrees). Tooth 7 may have a similar angular profile as tooth 6. In this manner, teeth 5-7 may be angled more vertically with respect to clamping surface 280 than teeth 1-4. The angular profile of teeth 5-7 allows teeth 5-7 to grip into the surface to be clamped, when the clamp bolt/screw (not shown) is tightened, to enhance the gripping power along a z direction (e.g., length direction) of the member being clamped.

In this manner, clamping surface 280 may have a first number of teeth having a first angular profile (also referred to as the groove profile) and a second number of teeth having a second angular profile/groove profile. These groove profiles may enhance the gripping power of clamp 100 in multiple directions.

As described above, clamp 100 may be used to clamp structures having different sizes. In one implementation, the length of portion 112 from the nose portion to face 210 (labeled L1) may range from 0.30 inches to 0.50 inches (e.g., 0.385 inches). In addition, the height of portion 112 (labeled H) from the left side of the clamping surface to top portion 110 may range from about 0.20 inches to 0.40 inches (e.g., 0.235 inches). Further, the lateral length of tooth 1 from the left side of portion 112 (labeled L2) may range from 0.50 inches to 0.70 inches (e.g., 0.60 inches) and the lateral length between tooth 1 and tooth 2 (represented by L3) may range from 0.40 to 0.60 inches (e.g., 0.50 inches). In one implementation, the lateral length between each of the other teeth (e.g., tooth 2 and 3, tooth 3 and 4, etc.) may be the same or similar to distance L3 (e.g., 0.50 inches).

The dimensions described above with respect to clamp 100 (e.g., lengths, distances, angles, angular profiles, etc.) are exemplary only. It should be understood that other dimensions may be used based on the particular implementation and devices/structures to which clamp 100 is intended to secure.

FIG. 3A is a top view of clamp 100. Referring to FIG. 3A, in an exemplary implementation, the width of top portion, labeled W1, may range from about 1.0 inches to about 3.0 inches and mounting hole 116 may be centered with respect to the width dimension. That is, the width labeled W2 may be one half of W1. In one implementation, W1 may be 1.50 inches and W2 may be approximately 0.75 inches. In addition, in exemplary implementations, the diameter of mounting hole 116 may range from 0.20 inches to 0.40 inches, depending on the particular clamp 100 and the diameter of the clamp bolt being used. For example, in one implementation, the diameter of mounting hole 116 may be 0.26 inches.

FIG. 3B is a cross-section of clamp 100 taken along line AA in FIG. 3A. As illustrated, the lower portion 140 of clamp 100 includes opening 142 that aligns in the axial direction with mounting hole 116. Opening 142 helps align a clamp screw that extends through mounting hole 116 to a clamp nut (not shown), as described in more detail below.

FIG. 3C is a bottom view of clamp 100. Referring to FIG. 3C, the inner most one of teeth 114 located adjacent face 210 (i.e., tooth 7 illustrated in FIG. 2B) is aligned in the lateral direction very close to the outer edge of mounting hole 116. As described above, locating through hole 116 relatively close in the lateral direction to the clamping surface aids in allowing clamp 100 to be tightened/torqued to the adequate level while ensuring that the clamping surface (i.e., teeth 114) will not slip from the member being secured.

As described above, clamp 100 may be used to clamp a panel or frame, such as a solar panel, to a support structure. For example, clamp 100 may be an end panel clamp used to secure the end portion of a panel to a support structure, as described in detail below.

FIG. 4 illustrates an isometric view of clamp 100 securing panel 400 to support structure 420. In this implementation, panel 400 may be a solar panel with a frame portion 410 made of metal and support structure 420 may be a framing channel or strut channel (also referred to herein as strut 420) having a U-shape with an open end 422.

As illustrated, clamp 100 may include clamp bolt 160, lock washer 170 and flat washer 180. Clamp bolt 160 (also referred to as clamp screw 160) may be a threaded bolt (e.g., a hex cap bolt) or screw that extends through the center of openings 116 and 142 into the open portion of strut 420, where it is connected to a securing mechanism, such as a strut nut (not shown) that secures clamp 100 to strut 420. Lock washer 160 and flat washer 170 aid in ensuring that clamp bolt 160 does not loosen.

As illustrated in FIG. 4, the outer side of panel 400 abuts face 210 of clamp 100 and teeth 114 grip into frame 410. As described above, the more acute angular profile of teeth 1-4 aid in ensuring that panel 400 does not move in the direction labeled x in FIG. 4 (along the width of panel 400) after clamp bolt 160 is tightened/torqued. The angular profile of teeth 5-7 aid in ensuring that panel 400 does not move in the direction labeled z in FIG. 4 (along the length of panel 400) after clamp bolt 160 is tightened/torqued. In addition, the location of mounting hole 116 results in clamp bolt 160 being located very close in the lateral direction to panel 400 and the head of clamp bolt 160 actually being located over a portion of frame 410. Locating mounting hole 116 and clamp bolt 160 in this manner helps ensure that clamp 100 will not slip while clamp bolt 160 is being tightened/torqued.

As described above, in an exemplary implementation, panel 400 may be a solar panel that includes frame 410, which may be made out of metal. In other implementations, panel 400 may be another type of panel and frame 410 may be made out of plastic or some composite material. In each case, teeth 114 may contact the upper surface of frame 410 to secure panel 400 to strut 420.

As described above, support structure 420 may be a strut channel that includes a number of U-shaped members that support one or more panels 400. The U-shaped structures include an open end 422. The open end 422 aids in installing a strut nut to clamp bolt 160. That is, a clamp bolt may thread onto a strut nut (not shown in FIG. 4), which contacts the side surfaces of strut 420, as described in detail below.

Figure 5:
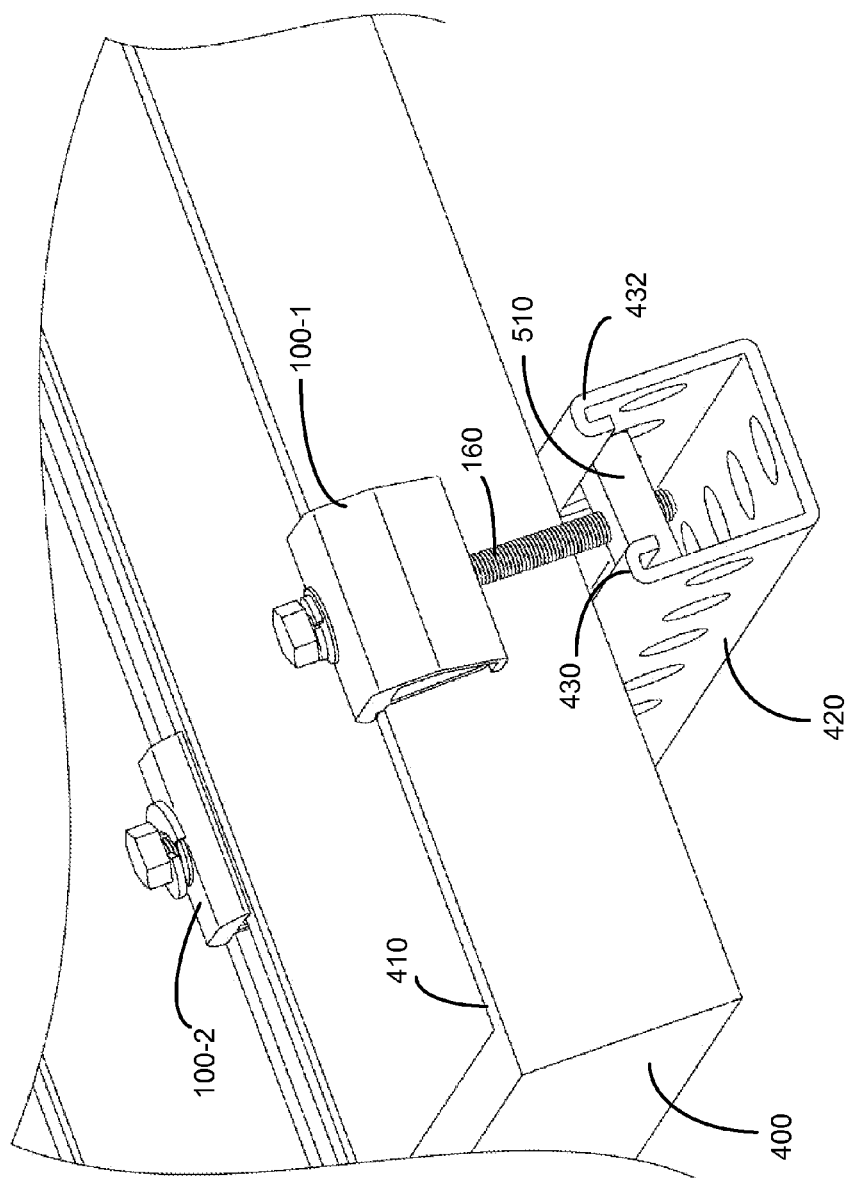
FIG. 5 is another isometric view of two clamps securing the panel of FIG. 4 to the strut channel member.

FIG. 5 illustrates two end panel clamps 100 securing panel 400. As illustrated, one clamp labeled 100-1 may be located on one side of panel 400 and a second clamp labeled 100-2 may be located on an opposite side. In some implementations, clamp 100-2 may be a mid-panel clamp, as opposed to an end panel clamp. That is, clamp 100-2 may clamp a panel on each side of clamp 100-2. In this implementation, the top portion 110 of clamp 100-2 may include two clamping surfaces (e.g., teeth 114 forming a clamping surface 280) configured as described above with respect to FIG. 2A-3C. In addition, the top portion 110 of the mid-panel clamp may include two mounting holes for the clamp bolts/screws. Each mounting hole/clamp bolt or screw may be located in a similar manner as that described above with respect to mounting hole 116. In other implementations, the mid-panel clamp 100 may include a single mounting hole located in a similar manner with respect to each panel being clamped, as described above with respect to mounting hole 116.

As further illustrated in FIG. 5, strut nut 510 is installed in the open end of strut 420. Strut nut 510 includes a threaded opening that mates with the threads from clamp bolt 160. As also illustrated, the side members of strut 420 include J-shaped rims 430 and 432 at the upper portion of strut 420. The upper surface of strut nut 510 may abut the lower surfaces of rims 430 and 432 and the side surface of strut nut 510 may abut the sides of strut 420 to ensure that strut nut 510 does not move in vertical direction (the y direction illustrated in FIG. 4). In this manner, clamp 100 may be secured to strut 420 via strut nut 510.

Figure 6:
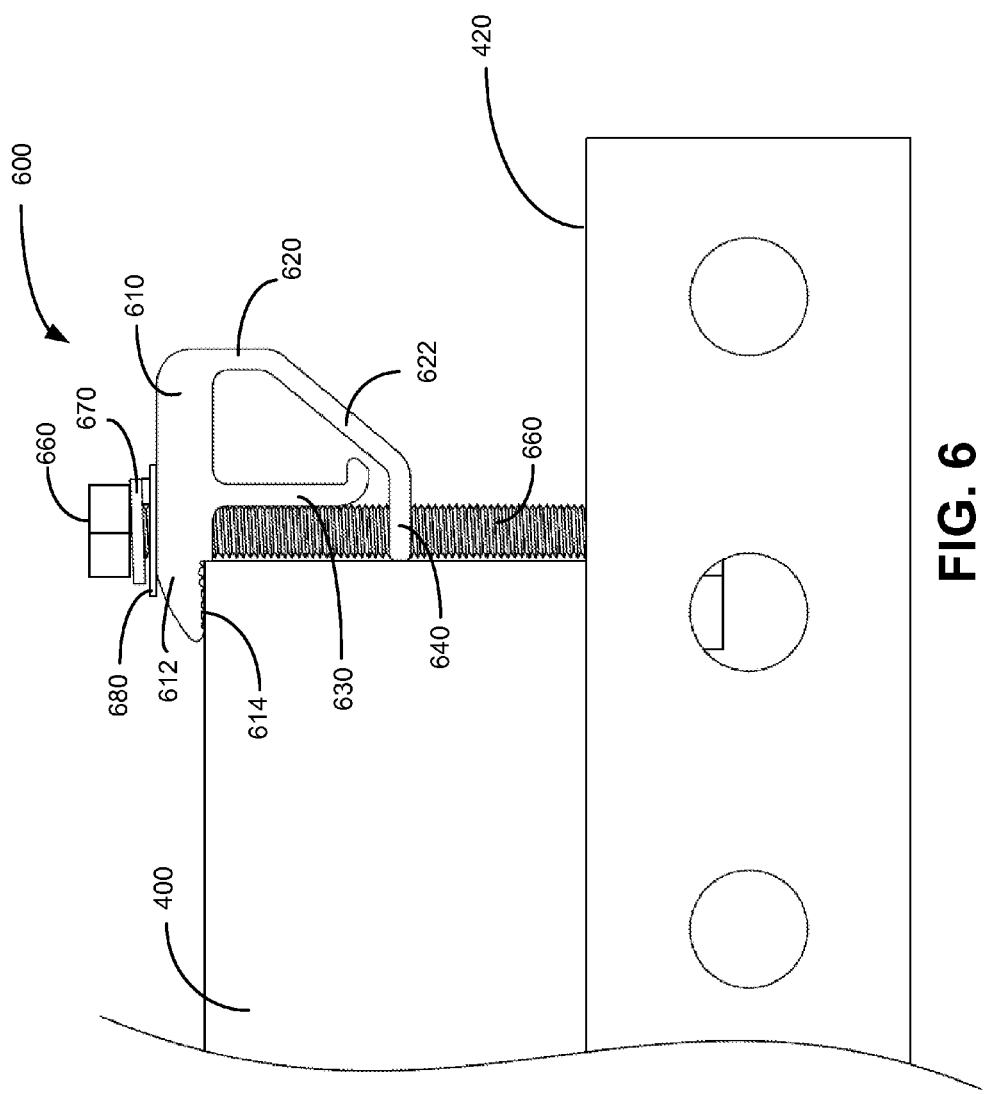
FIG. 6 is a side view of another exemplary clamp securing a panel to a strut channel member.

FIG. 6 illustrates a side view of another exemplary clamp 600 securing panel 400 to framing structure 420 in accordance with another exemplary implementation. In this implementation, clamp 600 may include top portion 610 having angled portion 612, side portion 620 having angled portion 622, and lower portion 640. Portions 610, 612, 620, 622 and 640 of clamp 600 may be similar to top portion 110, angled portion 112, side portions 120 and 122 and lower portion 140, respectively, of clamp 100 described above. Clamp 600 may also include side member 630. In this implementation, side member 630 may extend from top portion 610 at a 90 degree angle. Side portion 630, however, may not join lower portion 640, as illustrated in FIG. 6. Side portion 630 and side portion 620 provide structural rigidity and strength for clamp 600.

Clamp 600 also includes clamp bolt 660, lock washer 670 and flat washer 680. These elements may function similar to clamp bolt 160, lock washer 170 and flat washer 180 described above. As illustrated, upper portion 610 may also be beveled (similar to clamp 100) to include an angled portion 612. The lower surface of angled portion 612 may include teeth/clamping surface 614. Teeth 614 may include a number of teeth similar to teeth 114. That is, teeth 614 may include a first number of teeth having a first angular profile similar to teeth 1-4 and a second number of teeth having a second angular profile similar to teeth 5-7 described above with respect to FIG. 2B. The clamping surface associated with teeth 614 may also be angled in a similar manner as clamping surface 114 described above with respect to FIG. 2B.

Figure 7:
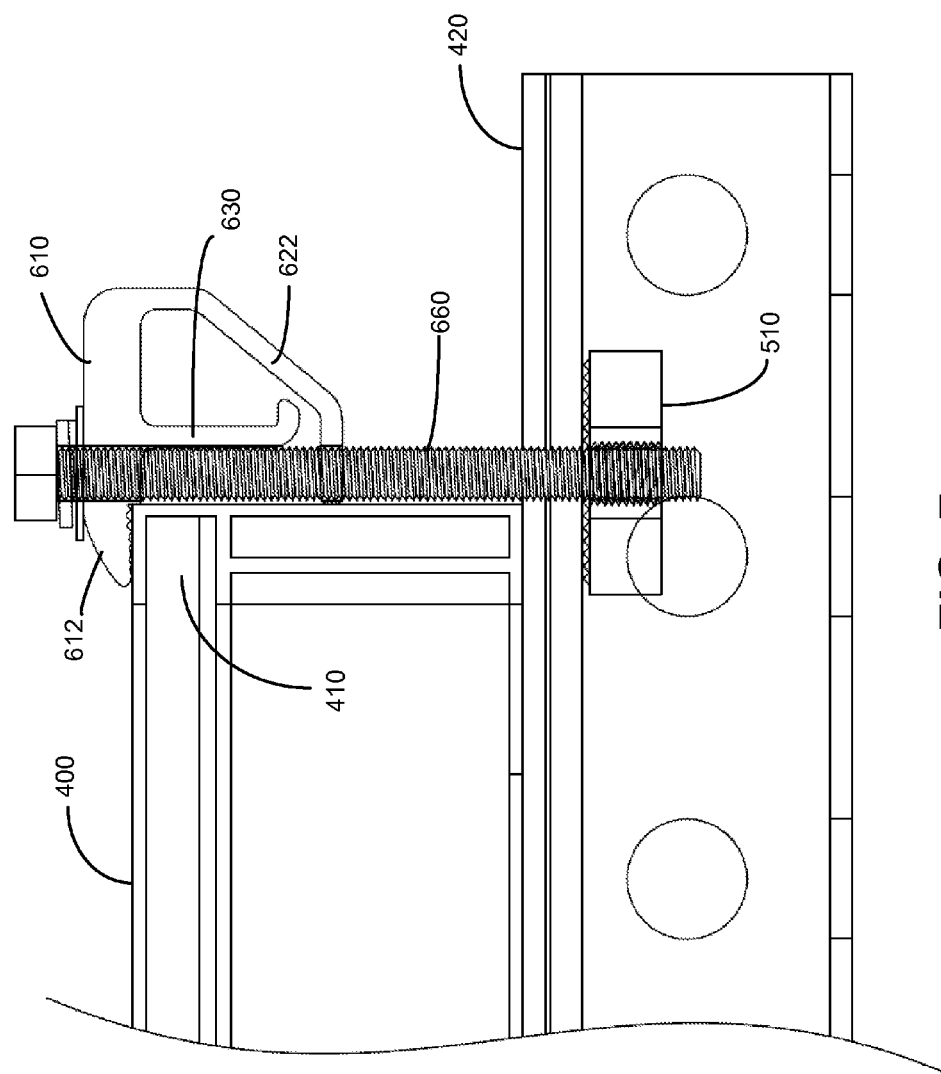
FIG. 7 is a cross-sectional view of the clamp, panel and strut channel member of FIG. 6.

FIG. 7 is a cut-away or cross-sectional view of clamp 600 securing panel 400 to strut 420 via strut nut 510. As illustrated, clamp screw 660 is threaded into mating threads of strut nut 510. Strut nut 510 abuts the sides of strut 420 to secure strut nut 510. In addition, the upper surface of strut nut 510 abuts the underside of strut 420 (e.g., the lower surfaces of rims 430 and 432) and the side surfaces of strut nut 510 about the sides of strut 420 to further secure strut nut 510 within strut 420, as described above with respect to FIG. 5. As also illustrated, clamp screw 660 is located very close in the lateral direction to panel 400 and a portion of the head of clamp bolt 660 is located over a portion of frame 410. Locating mounting hole 116 and clamp bolt 660 in this manner helps ensure that clamp 600 will not slip while clamp bolt 660 is being tightened/torqued.

Implementations described herein provide a clamp that that may be used in combination with structural members, such as struts, to secure devices having various sizes, thicknesses, etc., to the structural members. The clamp may include a clamping surface made up of teeth having different angular profiles to enhance the gripping power of the clamp in various directions with respect to the member being clamped. In addition, the location of the clamp bolt/screw with respect to the member being clamped may help ensure that the clamp does not slip while it is being tightened/torqued, or after the clamp is installed.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments.

For example, as described above, clamp 100 or 600 may secure a device, such as a solar panel frame, to a framing channel or strut channel. In an exemplary implementation, strut 420 may be one of a large number of struts used to support a solar table assembly that includes a number of solar panels. It should be understood, however, that clamp 100/600 may be used to secure any type of device with any type of structural member.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above mentioned description is to be considered exemplary, rather than limiting, and the true scope of the invention is that defined in the following claims.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A clamp configured to clamp a first structure to a framing member, comprising:
    a top portion having a mounting hole configured to receive a mounting bolt, and wherein the top portion further includes a clamping surface configured to contact the first structure;
    a lower portion having a semicircular opening through which the mounting bolt passes; and
    a middle portion connected to the top portion and the lower portion,
    wherein the clamping surface includes a plurality of teeth and wherein at least some of the teeth have different angular profiles, and
    wherein the top portion, lower portion and middle portion are formed as a single body or structure.

2. The clamp of claim 1, wherein the top portion includes a planar portion and a beveled portion, and wherein the clamping surface is angled with respect to the planar portion.

3. The clamp of claim 1, wherein the plurality of teeth include a first number of teeth having a first angular profile and a second number of teeth have a second angular profile.

4. The clamp of claim 3, wherein sidewalls associated with each of the first number of teeth form a smaller angular profile than sidewalls of each of the second number of teeth.

5. The clamp of claim 3, wherein first sidewalls of each of the first number of teeth form an angle ranging from approximately 30 degrees to 40 degrees with respect to the clamping surface.

6. The clamp of claim 5, wherein second sidewalls of each of the first number of teeth form an angle ranging from approximately 80 degrees to 100 degrees with respect to the clamping surface.

7. The clamp of claim 1, wherein an outer edge of the mounting hole is located adjacent an innermost one of the plurality of teeth.

8. The clamp of claim 1, wherein the top portion includes a planar portion and an angled portion with respect to the planar portion and wherein the clamping surface is located on a lower surface of the angled portion.

9. A clamp configured to clamp a first structure to a framing member, comprising:
    a top portion having a mounting hole configured to receive a mounting bolt, and wherein the top portion further includes a clamping surface configured to contact the first structure;
    a lower portion; and
    a middle portion connected to the top portion and the lower portion,
    wherein the clamping surface includes a plurality of teeth and wherein at least some of the teeth have different angular profiles, and
    wherein the top portion includes a first face located adjacent an innermost one of the plurality of teeth of the clamping surface, and wherein an outermost face of the lower portion does not extend, in the lateral direction, past the first face of the top portion.

10. A clamp, comprising:
    a top portion including:
        a clamping surface configured to contact a first structure to be secured by the clamp, wherein the clamping surface includes a plurality of teeth comprising a first plurality of teeth and a second plurality of teeth,
        wherein the first plurality of teeth are located adjacent to each other on an outer portion of the clamping surface,
        wherein the second plurality of teeth are located adjacent to each other on an inner portion of the clamping surface, and wherein the first plurality of teeth have different angular profiles than the second plurality of teeth, and a mounting hole configured to receive a mounting bolt or screw; and a lower portion connected to the top portion, wherein the lower portion includes an opening to allow the mounting bolt or screw to pass through, and wherein the mounting hole is located so that the mounting bolt or screw passes through the top portion adjacent, in the lateral direction, an innermost one of the second plurality of teeth.

11. The clamp of claim 10, wherein the top portion includes a planar portion and an angled portion, and wherein the clamping surface is angled with respect to the planar portion and is located on a lower surface of the angled portion.

12. The clamp of claim 10, further comprising:

the mounting bolt, wherein the mounting bolt is threaded; and a clamp nut, wherein the mounting bolt is secured to the clamp nut via mating threads of the clamp nut.

13. The clamp of claim 10, wherein first sidewalls of the first plurality of teeth form a smaller angle with respect to the clamping surface than first sidewalls of the second plurality of teeth.

14. The clamp of claim 13, wherein the first sidewalls of each of the first plurality of teeth form an angle ranging from approximately 30 degrees to 40 degrees with respect to the clamping surface.

15. The clamp of claim 14, wherein the first sidewalls of each of the second plurality of teeth form an angle ranging from approximately 50 degrees to 70 degrees with respect to the clamping surface.

16. The clamp of claim 10, wherein an angular profile of each of the first plurality of teeth is smaller than an angular profile of each of the second plurality of teeth.

17. The clamp of claim 10, wherein an outer edge of the mounting hole is located, in a lateral direction, adjacent the innermost one of the second plurality of teeth.

18. An assembly, comprising:

a panel;

a support structure configured to support the panel; and a clamp configured to secure the panel to the support structure, wherein the clamp comprises:

a clamp bolt or screw, a clamping surface configured to contact the panel, wherein the clamping surface includes a plurality of teeth and wherein at least some of the plurality of teeth have different angular profiles with respect to the clamping surface, and a mounting hole configured to receive the clamp bolt or screw, wherein the clamp bolt or screw is located adjacent an innermost one of the plurality of teeth.

19. The assembly of claim 18, further comprising:

a nut located in an open portion of the support structure, wherein the clamp bolt or screw includes threads that mate with corresponding threads of the nut to secure the panel to the support structure.

20. The assembly of claim 18, wherein the plurality of teeth include a first plurality of teeth and a second plurality of teeth, wherein the first plurality of teeth are located adjacent to each other on an outer portion of the clamping surface, and the second plurality of teeth are located adjacent to each other on an inner portion of the clamping surface, and wherein first sidewalls of the second plurality of teeth form a smaller angle with respect to the clamping surface than first sidewalls of the second plurality of teeth.

* * * * *